United States Patent
Wendt et al.

(10) Patent No.: US 6,577,230 B1
(45) Date of Patent: Jun. 10, 2003

(54) NETWORK FOR DATA AND ENERGY TRANSFER

(75) Inventors: Matthias Wendt, Würselen (DE); Wolfgang Budde, Aachen (DE); Peter Fuhrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 252 days.

(21) Appl. No.: 09/660,915

(22) Filed: Sep. 13, 2000

(30) Foreign Application Priority Data

Sep. 14, 1999 (DE) .......................... 199 43 897
Dec. 14, 1999 (DE) .......................... 199 60 471

(51) Int. Cl.⁷ .......................................... H04M 11/04
(52) U.S. Cl. ..................... 340/310.01; 340/310.02; 340/310.06
(58) Field of Search ................ 340/310.01, 310.02, 340/310.07, 531, 568.2, 310.06; 370/282, 295, 485; 375/219, 258

(56) References Cited

U.S. PATENT DOCUMENTS

| 4,355,303 A | * | 10/1982 | Phillips et al. ......... 340/310.02 |
| 4,621,170 A | | 11/1986 | Picandet ................. 340/310.05 |
| 4,734,919 A | * | 3/1988 | Tae ........................... 375/219 |
| 5,210,519 A | * | 5/1993 | Moore .................... 340/310.06 |
| 5,406,260 A | * | 4/1995 | Cummings et al. ...... 340/568.2 |
| 5,789,959 A | | 8/1998 | Dielacher et al. .......... 327/303 |

* cited by examiner

Primary Examiner—Van Trieu
(74) Attorney, Agent, or Firm—Steven R. Biren

(57) ABSTRACT

For a network comprising at least two lines and network users, both a transfer of data and a terminal for energy transfer through the network are realized in that the two lines (1, 2) of the network are formed both for a data transfer among the network users (3, 4, 5, 6) and for energy transfer from a voltage source to the network users (3, 4, 5, 6), in that the data are symmetrically and differentially transferred through the two lines (1, 2), in that a terminal of the voltage source is coupled to the two lines (1, 2), in that the network users (3, 4, 5, 6) are coupled to the other terminal of the voltage source via a different electric connection separated from the network, in that the network users (3, 4, 5, 6) symmetrically couple out the energy transfer via the two lines (1, 2) of the network, and in that the two lines (1, 2) are mutually insulated.

10 Claims, 2 Drawing Sheets

NETWORK FOR DATA AND ENERGY TRANSFER

BACKGROUND OF THE INVENTION

The invention relates to a network comprising at least two lines and network users. Such networks are known in many forms and are used to transfer data between the network users.

For use in vehicles, several bus systems are also known. In the last few years, the CAN bus has become particularly known. It is especially used for transferring control information and for sensor detection. However, similarly as other known bus systems, this bus system is not capable of transferring both data and energy for the network users.

It is an object of the invention to provide a network which is equally suitable for both data and energy transfer and for which a minimal number of connection lines is sufficient.

SUMMARY OF THE INVENTION

According to the invention, this object is solved in that the two lines of the network are formed both for data transfer among the network users and for energy transfer from a voltage source to the network users, in that the data are symmetrically and differentially transferred through the two lines, in that a terminal of the voltage source is coupled to the two lines, in that the network users are coupled to the other terminal of the voltage source via a different electric connection separated from the network, in that the network users symmetrically couple out the energy transfer via the two lines of the network, and in that the two lines are mutually insulated.

The network thus comprises two lines which are formed both for data transfer among the network users and for energy transfer to the network users. A terminal of a voltage source is coupled to the network users via the two lines of the network. Another terminal is coupled to the network users via another path which does not belong to the network.

The data transfer takes place symmetrically and differentially through the two lines, i.e. a data bit is transferred with different polarities through the two lines.

However, the energy transfer is implemented in such a way that possibly equal currents flow in the two lines. This is achieved by a symmetrical coupling-out of the energy by the network users from the two lines of the network.

It is thereby achieved that the two lines are suitable for both energy and data transfer.

Due to the differential transfer of the data and the symmetrical transfer of the power supply currents on the two lines, it is achieved that disturbances in the power supply line have only a very weak effect on the data transfer so that the transfer of information is not affected under these circumstances.

As compared with known solutions, not only fewer lines but also fewer contact points are required. This enhances the reliability.

Since a terminal of the energy transfer is jointly transferred through the two lines of the network, energy transfer is still guaranteed in the case of a drop-out of a line or the connection of such a line to a network user. Only the data transfer is then disturbed; the network user can, however, continue to work, for example, with an emergency program. This is of great importance, particularly in vehicles. By transferring a pole of the energy transfer jointly via the two lines of the network, the cross-section of the individual lines can be halved as compared with the original power supply line so that the signal transfer does not require substantially any additional line cross-section.

There should be a good magnetic and capacitive coupling between the two lines of the network. This may be achieved, for example, by twisting the lines. Due to the satisfactory coupling which is thereby achieved between the two lines, ambient magnetic and electric alternating fields substantially have the effect of common mode disturbances on the two lines and thus do not disturb the data transfer, which takes place differentially.

An embodiment of the invention as defined in claim 2 provides advantageous embodiments, particularly for the network users. These can couple in and couple out the data inductively or capacitively. Since particularly a symmetrical coupling-out of its consumption current from the two lines of the network is important, inductances are provided in the network users, via which inductances these currents are coupled out. Simultaneously, these inductances mutually decouple the two lines, which is again necessary for the data transfer. In this relatively simple way, both a decoupling of the two lines and a symmetrical coupling-out of the consumption currents can thus be achieved.

As is provided by a further embodiment of the invention as defined in claim 3, the differential evaluation of the data transferred through the two lines of the network can be advantageously realized by means of a differential amplifier.

Coupling-in can again be effected advantageously, as defined in claim 4, by means of an amplifier which has a non-inverting and an inverting output which are each coupled to one of the two lines of the network.

In a further embodiment of the invention as defined in claim 5, the network should be basically arranged in a star configuration. Ring-shaped wiring within the network may cause low-frequency currents. To avoid them, it is advantageous to provide a ring coupler which DC separates the lines within such a circuit. A short-circuit of low-frequency currents in such a ring is thereby prevented. A magnetic and capacitive coupling between the two lines of the network which is advantageous for the function of the network, as defined in claim 6, may be achieved, for example, by twisting these lines.

As already described above, a terminal of the energy supply can be connected via the network. Another terminal is to be connected to the network users via a different path. For example, in vehicles, this may be the chassis. However, for given applications, it is possible, as defined in claim 8, to provide two networks according to the invention each taking over a terminal for the energy supply. In this case, the data can then be advantageously transferred redundantly through the two networks. This results in an additional reliability of transfer or security against failures.

These and other aspects of the invention are apparent from and will be elucidated with reference to the embodiments described hereinafter.

DESCRIPTION OF THE PREFERRED EMBODIMENT

Figure 1:
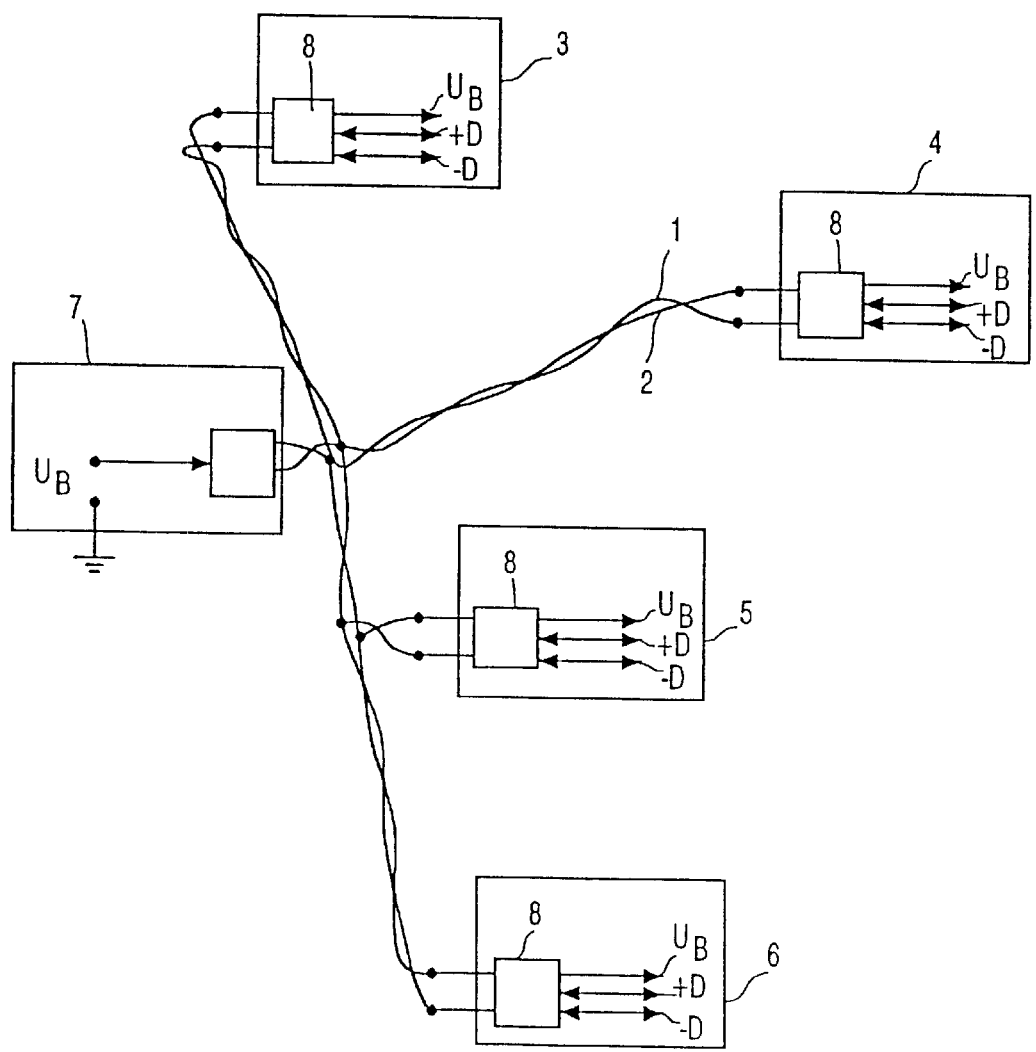
FIG. 1 shows diagrammatically a network according to the invention with some network users and a power supply.

FIG. 1 shows the topology of a network according to the invention.

The network may be, for example, of a type used in a vehicle interconnecting a plurality of network users in the vehicle. The network has two lines 1 and 2 which should be satisfactorily coupled together electrically and magnetically and are, to this end, for example, twisted.

Network users 3, 4, 5, and 6 are coupled together by means of the two network lines 1 and 2. A network user 7 supplying energy to the network is also provided.

The network users 3, 4, 5 and 6 can exchange data via the network with the two lines 1 and 2. Furthermore, they are connected to a terminal of the power supply via the network.

The transfer of data takes place symmetrically differentially via the lines 1 and 2, i.e. a data bit is transferred with opposite polarities through the two lines 1 and 2 and evaluated accordingly by the receiving network users.

The energy supply takes place symmetrically via the two lines 1 and 2. In this respect, it is important that the network users 3, 4, 5 and 6 symmetrically couple out the power supply currents from the two lines 1 and 2, i.e. each network user couples out the same power supply current from the two lines.

Coupling-in of a terminal of a voltage source $U_B$ is effected by means of the network user 7. In this case it is important that the two lines 1 and 2 are coupled in an identical manner to the positive terminal of the voltage source $U_B$ so that the power supply currents flowing through the two lines 1 and 2 are equally large. The other terminal of the voltage source $U_B$ may be connected, for example, via the vehicle chassis. Since also the other network users 3, 4, 5 and 6 are coupled to the chassis of the vehicle, the second terminal of the energy supply can be coupled without any problem to the users via the chassis of the vehicle.

Figure 2:
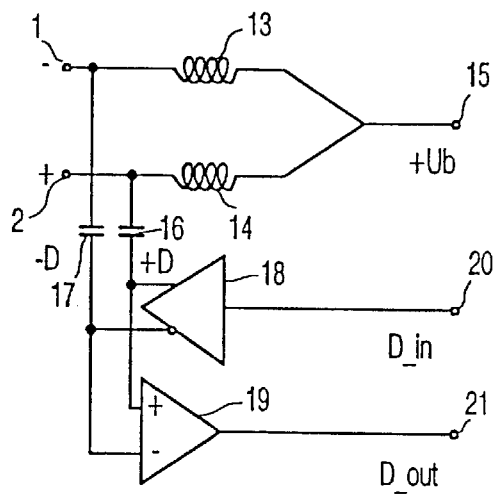
FIG. 2 shows an example of a network user with a capacitive coupling-in and coupling-out of data.
Figure 3:
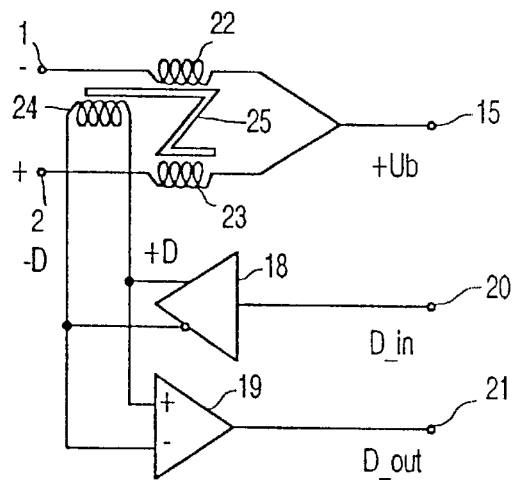
FIG. 3 shows an example of a network user with an inductive coupling-in and coupling-out of data.
Figure 4:
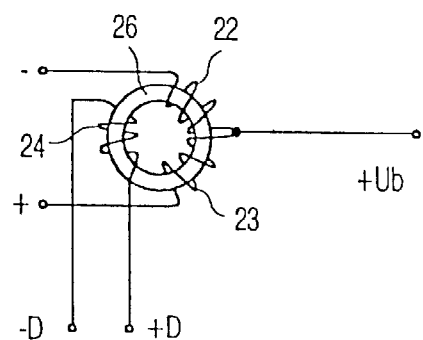
FIG. 4 shows an embodiment of an inductive coupling-in and coupling-out of data by means of a special network coupler.

The network users 3, 4, 5 and 6 each have a coupling circuit 8 whose construction will be further elucidated with reference to FIGS. 2 to 4. It is an object of this coupling circuit 8 to ensure, on the one hand, that the power supply currents coupled out by the network users 3 to 6 from the two lines 1 and 2 of the network are symmetrical, i.e. that it should hold for each network user that he couples out power supply currents of equal values from the two lines 1 and 2. Moreover, the coupling circuits 8 are required to be able to couple in and couple out the data transferred symmetrically and differentially through the two lines 1 and 2.

The topology of the network shown in FIG. 1 has a star configuration so that no ring-shaped elements are formed in the network. However, when ring-shaped elements are formed in parts of the network, it is possible that low-frequency currents flow in these parts. Since this is to be avoided, a ring coupler is advantageously provided in such a ring, which ring coupler DC separates the lines in the circuit.

A few possible embodiments of the coupling circuits 8 in the network users 3, 4, 5 and 6 as shown in FIG. 1 will hereinafter be elucidated with reference to FIGS. 2, 3 and 4.

FIG. 2 shows a first embodiment for such a coupling circuit in which the data are capacitively coupled into and out of the two lines 1 and 2 of the network. One terminal of the energy supply is also coupled out of the two lines 1 and 2 via this coupling circuit.

FIG. 2 shows two inductances 13 and 14 via which a power supply terminal 15 is coupled to the two lines 1 and 2 of the network. The two inductances 13 and 14 should absolutely have the same value in order that the same power supply currents are taken from the two lines 1 and 2 of the network in the required way.

The data are coupled in and out via two capacitances 16 and 17, which capacitances are coupled at one end to the two lines 1 and 2 of the network and are connected at the other end to amplifiers 18 and 19, respectively.

A network user in which the coupling circuit shown in FIG. 2 is provided makes the data to be transferred through the network available at a first data terminal 20. These data, which are denoted by D_in in the Figure, are applied to the first amplifier 18. The first amplifier 18 has a non-inverting output which is connected to the capacitance 16. A second inverting output is connected to the capacitance 17 which is coupled to the line 1 of the network. The data D_in are thereby transferred in a symmetrical and differential form via the capacitances 16 and 17 on the two lines 1 and 2 of the network. A data bit is coupled, for example, with a positive polarity on the line 2 and with a negative polarity on the line 1 of the network.

Data which are transferred through the two lines 1 and 2 of the network and which are to be evaluated by the network users in which the coupling circuit of FIG. 2 is provided, are applied via the capacitances 16 and 17 to the second amplifier 19. The second amplifier 19 is a differential amplifier, one input of which receives the data transferred with a positive polarity via the line 2 and the other input of which receives the data transferred with a negative polarity via the line 1. The output of the differential amplifier supplies a data signal D_out which is made available at a source 21 to the network user in which the coupling circuit of FIG. 2 is provided.

Due to the capacitive coupling-out of the data transferred differentially and symmetrically via the two lines 1 and 2, it is achieved that DC disturbances or disturbances with a very low frequency do not have any effect on the data evaluation or also on the coupling of data into the lines. Conversely, a symmetrical coupling-out of the power supply currents via the two inductances 13 and 14 has the effect that the data transfer is not disturbed.

FIG. 3 shows a second embodiment of a coupling circuit in which the data are inductively coupled in and out. Here again, the power supply potential +Ub is made available at the terminal 15 to the network user in which the coupling circuit is provided. Coupling-out takes place via two inductances 22 and 23 from the two lines 1 and 2 of the network. Here again, it is essential that the inductances 22 and 23 have the same value.

An essential difference of the circuit of FIG. 3 with that of FIG. 2 is that the circuit of FIG. 3 inductively couples the data in and out.

This is achieved in that a third inductance 24 is provided which is magnetically coupled to the two inductances 22 and 23 via a magnetic coupling 25.

The two terminals of the third inductance 24 are coupled to the outputs of an amplifier 18 having an inverting and a non-inverting output. This amplifier supplies the data D_in from a data terminal 20. Moreover, the two terminals of the third inductance 24 are coupled to an inverting and a non-inverting input of an amplifier 9 whose output supplies the data D_out at a data terminal 21. The circuitry of the amplifiers 18, 19 and the data terminals 20, 21 thus corresponds to that of the first embodiment of the coupling circuit of FIG. 2.

FIG. 4 shows how the inductive coupling-out may be realized in practice by means of the inductances 22, 23 and 24. In FIG. 4, these three inductances are provided as windings 22, 23 and 24 on a common magnet core 26 via which the inductances are magnetically coupled together.

In summary, the embodiment of the network according to the invention as shown in FIGS. 1 to 4 shows that both a differential symmetrical data transfer and via the transfer of a terminal of an energy supply can take place via the two lines 1 and 2 of the network without these mutually disturbing each other.

The network is universally usable. For example, it is not necessary that all network users actually use the data terminal. It is alternatively possible to connect users to the network which exclusively use the energy supply. However, then it should also be ensured that power supply currents can be symmetrically coupled out of the two lines 1 and 2 of the network.

The network may be implemented redundantly, i.e. it may be configured in a double form in which both the data are transferred redundantly through the two networks and in which moreover a terminal of the energy supply is transferred through the two networks. Also, two networks may be provided in such a form that both networks each couple a terminal of the energy supply to the network users. In this case, for example, in a vehicle, a transfer of a pole of the energy supply via the vehicle chassis is no longer required. In both cases, the data can be transferred redundantly through the two networks so that an additional security against failure is obtained.

Such a network may of course not only be used in vehicles but also in other areas in which a connection between energy transfer and communication is advantageous. Examples are industrial automation, particularly field bus systems, aviation techniques and domestic automation in which the network may be used, for example, for lighting techniques, alarms, heating installations or air-conditioning systems.

What is claimed is:

1. A network comprising at least two lines (1, 2) and network users (3, 4, 5, 6), characterized in that the two lines (1, 2) of the network are formed both for data transfer among the network users (3, 4, 5, 6) and for energy transfer from a voltage source to the network users (3, 4, 5, 6), in that the data are symmetrically and differentially transferred through the two lines (1, 2), in that a terminal of the voltage source is coupled to the two lines (1, 2), in that the network users (3, 4, 5, 6) are coupled to the other terminal of the voltage source via a different electric connection separated from the network, in that the network users (3, 4, 5, 6) symmetrically couple out the energy transfer via the two lines (1, 2) of the network, and in that the two lines (1, 2) are mutually insulated.

2. A network as claimed in claim 1, characterized in that the network users (3, 4, 5, 6) inductively or capacitively couple in or couple out data, and in that inductances (13, 14; 22, 23) are provided by means of which the network users symmetrically couple their consumption current out of the two lines (1, 2) of the network and by means of which the two lines (1, 2) are mutually decoupled.

3. A network as claimed in claim 2, characterized in that the network users (3, 4, 5, 6) differentially evaluate the data coupled out of the lines (1, 2) by means of differential amplifiers (19).

4. A network as claimed in claim 2, characterized in that the network users (3, 4, 5, 6) differentially supply data by means of an amplifier (18) having a non-inverting and an inverting output.

5. A network as claimed in claim 1, characterized in that the network is essentially arranged in a star configuration and in that possibly provided closed circuits of the two lines are provided with ring couplers which DC separate the lines in the circuit.

6. A network as claimed in claim 1, characterized in that there is a magnetic and capacitive coupling between the two lines (1, 2).

7. A network as claimed in claim 1, characterized in that the cross-section of the two lines is dimensioned in such a way that it is sufficient for the energy jointly transferred through the two lines.

8. A network as claimed in claim 1, characterized in that two networks are provided via which a power supply terminal is coupled to the network user, and in that the data are redundantly transferred through the two networks.

9. Use of the network as claimed in claim 1 in a vehicle, in which the positive terminal of the vehicle battery is coupled to the network and the negative terminal is coupled to the vehicle chasis.

10. Use of the network as claimed in claim 1 for power supply and communication of electric domestic appliances.

* * * * *